Aug. 20, 1935.   B. R. BENJAMIN   2,011,925
TRACTOR CORN PICKER
Filed June 21, 1930   3 Sheets-Sheet 1

Inventor
Bert R. Benjamin
By N. P. Doolittle
Atty.

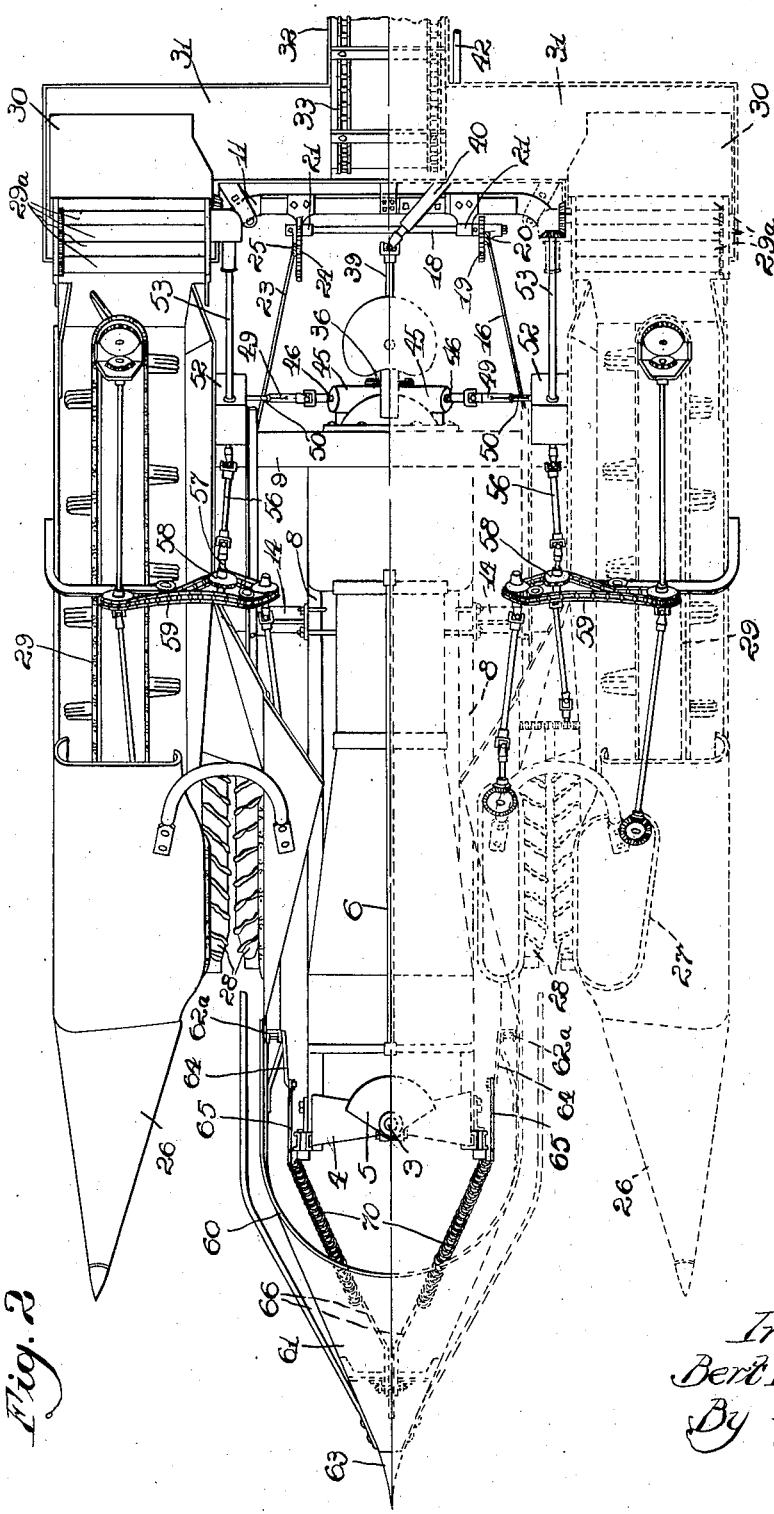

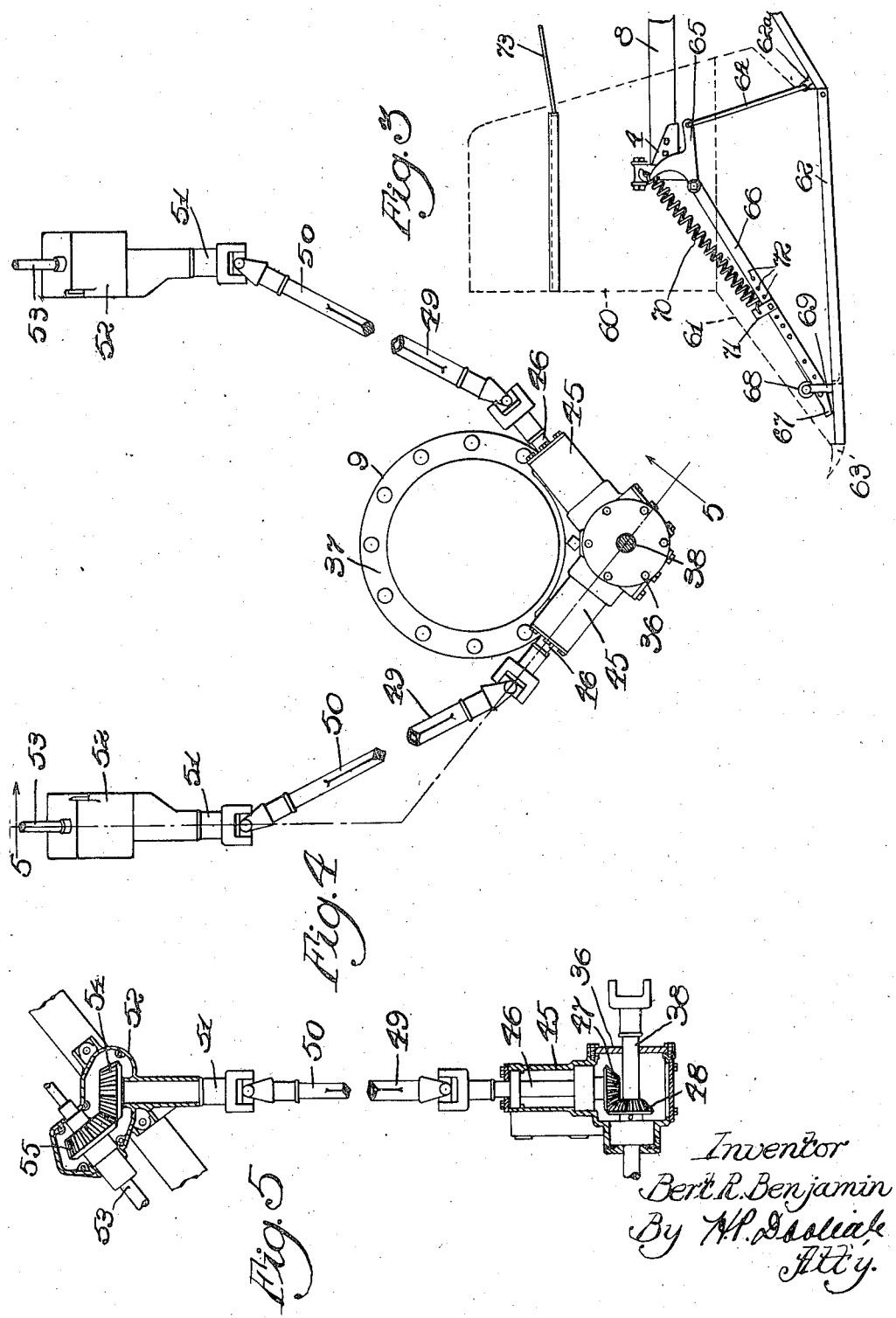

Patented Aug. 20, 1935

2,011,925

UNITED STATES PATENT OFFICE 2,011,925

TRACTOR CORN PICKER

Bert R. Benjamin, Oak Park, Ill., assignor to International Harvester Company, a corporation of New Jersey Application June 21, 1930, Serial No. 462,894

14 Claims. (Cl. 56—18)

This invention relates to a self propelled corn picker. More particularly it relates to a two-row corn picker organization adapted to be mounted on and operated by a tractor.

The principal object of the invention is to provide an improved tractor mounted corn picker.

Another object is to provide a corn picker organization suitable for mounting on the so-called tricycle type of tractor having a wide tread rear axle and traction wheels adapted to travel outside adjacent rows of such crops as corn, cotton, etc.

Another object is to provide a two row tractor corn picker constructed in such a manner that two adjacent rows of corn may be picked simultaneously without any part of the machine extending laterally a sufficient distance to break down or run over the rows of corn adjacent to those being picked.

Another object is to pivotally mount the picker units on the tractor for adjustment of the forward stalk gathering portions of said units.

Another object is to provide a simplified driving mechanism operated from the tractor power take-off for the picker units and for an elevator mounted behind the tractor.

Other objects will be apparent from the detailed description to follow.

In the drawings:

Figure 2 is a plan view of the device shown in Figure 1;

Figure 3 is an enlarged detail showing the central divider and stalk gathering means;

Figure 4 is an enlarged detail showing the driving means for the picker units; and, Figure 5 is a cross section taken on the line 5—5 of Figure 4.

Figure 1:
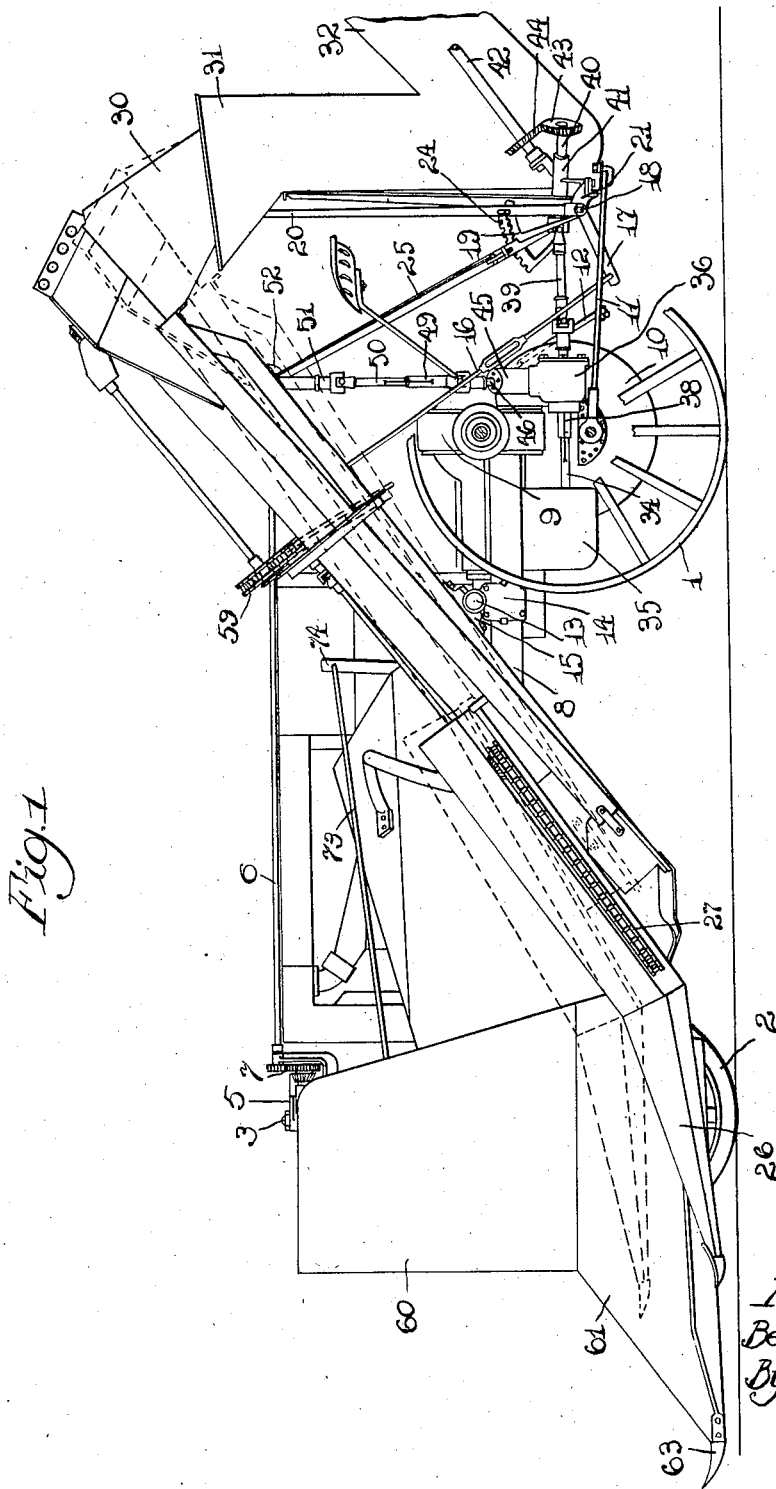
Figure 1 is a side elevation, partially in section, of a tractor mounted corn picker illustrating a preferred embodiment of the invention.

The tractor illustrated is of a well known type in wide use at the present time. The driving wheels 1 at the rear of the tractor have a tread such that they may be operated on the outside of two adjacent rows of corn planted at the conventional distance apart. The front wheels 2, which form a steerable rolling support for the front of the tractor are closely spaced and are adapted to run between the two rows straddled by the rear wheels. The front wheels are mounted on a steering post 3, which extends upwardly through a front frame member 4 on which the tractor is supported. At the top of the steering post a gear sector 5 is rigidly attached to the steering post 3. By means of a steering rod 6 extending rearwardly over the top of the tractor to the operator's seat and a train of gears 7 engaging the sector 5, the tractor is steered.

Side frame members 8 are attached at their forward ends to the front frame member 4 and to a transversely extended axle and differential housing 9. At the ends of the housing 9, opposite depending housings 10 contain gears for driving a stub axle, not shown, on which the rear wheels 1 are mounted. The housings 9 and 10 constitute an elevated or arched rear axle structure. These parts are not described more in detail, as they are of known construction and do not form a part of this invention except as they enter into the general organization claimed.

A U-shaped frame member 11 extends rearwardly of the tractor and is attached to the housings 10 below the axis of the traction wheels and supporting links 12 connect the longitudinal portions of the member 11 to points on the housings 10 above the points where the member 11 is attached thereto. The links 12 support the frame member 11 in horizontal position and permit the mounting of structures having considerable weight thereon.

A shaft 13 mounted on brackets 14 rigidly attached to the side frame members 8 provides a support for the corn picking units, which are mounted at either side of the tractor on the projecting ends of the shaft 13. Bearing brackets 15 are pivotally mounted on the shaft 13 for carrying the picker unit.

The frame structure of the picker unit is not shown, as it consists of a series of angle bars rigidly secured together in a conventional manner. On said frame structure the various elements of the picker units are mounted in a conventional manner. The general construction of such devices being well known in the art, it is considered that a diagrammatic representation of the essential elements of the picker units are sufficient for the purpose of this application. The bearing brackets 15 are secured to the frame structure and form a pivotal support for said units with respect to the tractor.

An adjustable link 16 is attached to the picker unit above its pivot axis and to a lever 17. The lever 17 is pivoted on the end of a rockshaft 18, best shown in Figure 2. A quadrant 19 is rigidly secured to the rockshaft 18. An angular extension 20 integral with the lever 17 is provided with a detent latch for engaging notches on the quadrant 19. The rockshaft 18 is rotatably mounted in brackets 21 rigidly secured to the frame member 11.

At the end of the rockshaft 18 opposite the quadrant 19 a lever not shown in the drawing similar to the lever 17, is rigidly attached. A link 23 connects the end of said lever to the picker unit at that side of the tractor. A quadrant 24 is rigidly secured with respect to the bracket 20. A hand lever 25 rigidly secured to the end of the rockshaft 18 is provided with a detent latch for engaging notches on the quadrant 24.

Each picker unit is provided with a forwardly extending gathering arm 26. These gathering arms are preferably mounted resiliently with respect to the main picker unit for permitting the gathering arms to follow the ground closely without digging into the soil. Gathering edges, represented by the dotted lines 27, are of a conventional construction. The snapping rolls 28 and the ear conveyor 29 extending alongside the snapping rolls may also be of any conventional construction. The conveyor extends upwardly to the top of the picking unit, which is vertically above the rear wheel of the tractor. A series of rolls 29a geared together for driving form means for conveying the snapped ears rearwardly to the discharge chute 30, which depends downwardly from the rearward end of the picking unit. The delivery chute 30 of each picking unit discharges into a hopper 31 and the hoppers 31 are extended centrally downward to deliver into an elevator housing 32 integral therewith. The housings forming the hoppers 31 and elevator 32 are suitably secured on the rear portion of the member 11. A drag link conveyor 33 in the elevator housing provides means for elevating the corn rearwardly upward to any suitable load carrying means which may be pulled behind the tractor.

The power for driving the picker mechanisms is obtained from a power take-off shaft 34 extending rearwardly from a gear casing 35 mounted beneath the main gear transmission housing of the tractor. A gear housing 36 is mounted at the rear of the axle housing 9. Figure 4 shows a removable plate 37, which is attached to the rear of the housing 9. The housing 36 extends downwardly beneath the main housing 9 and a shaft 38 extending through the housing and supported in suitable bearings therein is positioned in alignment with the power take-off shaft 34. The power take-off shaft is polygonal in cross section, and the shaft 38 is provided with a bore to slidably engage said shaft. The shaft 38 extends rearwardly through the housing 36 and is connected by universal joints and a shaft 39 to a shaft 40. The shaft 40 is mounted in a bearing bracket 41, which is rigidly secured with respect to the elevator housing 32. A shaft 42 extending upwardly substantially parallel to the elevator housing is also journaled in a bearing on the bracket 41. A bevel gear 43 mounted on the shaft 40 is adapted to engage and drive a bevel gear 44 mounted on the shaft 42.

The gear housing 36 has two upwardly and downwardly directed extensions 45. These extensions contain bearings for shafts 46. As best shown in Figure 5, the shafts 46 carry bevel gears 47, which are adapted to engage a bevel gear 48 carried on the shaft 38. Shafts 49 connected by universal joints to the shafts 46 are provided with bores rectangular in cross section for slidably engaging shafts 50 having a cross section the same as the bores. Each of the shafts 50 is connected by a universal joint to a shaft 51. The shaft 51 is mounted in a bearing carried by a housing 52. A shaft 53 also extends through suitable bearings in the housing 52 at an acute angle thereto. A bevel gear 54 carried by the shaft 51 is adapted to engage and drive a bevel gear 55 mounted on the shaft 53. At the forward end, each of the shafts 53 is connected by universal joints and a shaft 56 to a shaft 57. The shaft 57 is mounted for rotation on the picker unit. A gear 58 mounted on the shaft 57 by means of a chain 59 and suitable chain sprockets drive the gathering chains, the snapping rolls, and the ear conveyor. These drives are of a conventional construction and are, therefore, not described in detail, as their operation is clearly shown by inspection of the drawings. At the rear end each of the shafts 53 extends to provide driving means for the rollers 29.

The divider and stalk lifting unit at the front of the tractor consists primarily of a substantially semi-cylindrical upper shield 60 and a lower outwardly sloping shield 61. These two shields are connected together and the lower shield is mounted on a pair of forwardly extending frame members 62, which converge at their forward ends. A point 63 is provided at the forward end of the members 62. At the rear ends the frame members extend angularly upward and carry brackets 62ª, to which links 64 are pivotally connected. The links 64 are also pivotally connected to brackets 65, which are rigidly mounted on the front frame member 4 of the tractor frame. A pair of forwardly extending bars 66 are also pivotally attached to the brackets 65. The bars 66 extend downwardly and converge together. A member 67 is clamped between the forward ends of the bars 66 and forms with the ends of said bars a track which engages a roller 68. The forward end of the member 67 is turned upwardly to prevent the roller from running over the end.

The roller 68 is rotatably mounted on a support 69 which is attached to the frame members 62. Tension springs 70 are attached to the brackets 65 at points spaced above the points of attachment of the bars 66. The springs 70 are also attached to small brackets 71, which are secured to the bars 66. A plurality of spaced holes 72 are provided in the bars 66 providing means for connecting the brackets 71 in a plurality of positions, thereby altering the tension of the springs 70.

At the top of the upper shield 60 rods 73 are attached. The rods 73 extend rearwardly to levers 74 on the tractor, which provide means, not shown, for raising the divider above the ground.

In the operation of the embodiment of this invention illustrated, the tractor is driven with the front wheels between two adjacent rows of corn, the rear wheels operating outside of said rows. The divider is lowered so that is rests substantially on the ground. The tension of the springs 70 holds the divider resiliently in position. When the point 63 encounters a raised portion on the ground, the divider tilts upwardly, allowing it to clear such obstructions. The roller 68 operates on the track formed by the member 67 and the forward ends of the bars 66. Any down stalks are lifted by the divider and rest in a substantially upright position. The rods 63ª resiliently push the stalks outwardly into the path of the gathering chains 27 and the snapping rolls 28. The gathering arms 26 carried by the picker units have the same function as the divider at the forward end of the tractor. Corn snapped by the rolls 28 is carried upwardly by the conveyors 29 and is delivered through the chutes 30 into the hoppers 31. The conveyor 33 in the elevator housing delivers the corn into a wagon pulled behind the tractor. The means for supplying power to the picker units and to the elevator is fully explained in the detailed description of the elements making up the driving means.

By inspection of the drawings it will be noted that the gathering arms 26 are substantially in alignment with the front wheels of the tractor. Due to this arrangement, the wheels act as a gage for the gathering arms and allow the tractor to operate over the comparatively uneven ground without wide variation of the gathering arms with respect to the level of the ground. However, to take care of various conditions and uneven ground, the rockshaft 18 at the rear of the tractor and the associated levers and links provide means for independently adjusting the position of the picking units. The hand lever 25 rotates the rockshaft 18 and the levers 17 and 22 carried thereby. When the lever 25 is operated, it is, therefore, evident that both picker units are tilted the same amount. If it is found desirable to alter the relative angular position of the two units, this may be done by shifting the hand lever 20. By operating this lever, the relative position of the links 22 and 17 is altered.

Although applicant has illustrated and described a preferred embodiment of his improved device, it is to be understood that he claims as his invention all modifications falling within the scope of the appended claims.

What is claimed is:

1. A corn harvesting machine comprising a tractor, rear wheels on said tractor adapted to run on the outside of adjacent rows of corn, a front rolling support for said tractor, said tractor having a narrow longitudinally and centrally extending body portion, and picking means mounted at each side of the body portion intermediate the rear wheels and the front rolling support and positioned to pick corn from said adjacent rows.

2. A corn harvesting machine comprising a tractor, rear wheels on said tractor adapted to run on the outside of adjacent rows of corn, a narrow longitudinally and centrally extending body, a front rolling support for said body, picking means mounted on each side of the body intermediate the rear wheels and said front support, and conveying means positioned at each side of the tractor adapted to receive corn from the picking means and deliver it upwardly over the rear wheels.

3. A device as set forth in claim 2, in which the front rolling support is adapted to run between the adjacent rows of corn being picked.

4. A device as set forth in claim 2, in which a shield is mounted forwardly of the front rolling supoprt for lifting corn stalks and directing them toward the picking means.

5. A corn harvesting machine comprising the combination of a tractor having a transversely extended rear axle structure supported on wheels adapted to run on the outside of adjacent rows of corn, a narrow body extending forwardly from the center of the axle structure, a front rolling support on the body adapted to run between the same rows, a transverse support on the body in advance of the rear wheels, picking means pivotally mounted on the ends of said support between the sides of the body and the respective rear wheels, said means being operable to pick corn from adjacent rows, and gathering means carried by the picking means, said gathering means being positioned with the ground engaging ends substantially in transverse alignment with the front rolling support.

6. A device as set forth in claim 5, in which both picking units are operated by a power take-off connection at the rear of the axle structure.

7. A device as set forth in claim 5, in which conveying means are mounted on the picker units for delivering corn rearwardly.

8. A device as set forth in claim 5, in which the picker units are individually adjustable about their pivots on the transverse support.

9. A device as set forth in claim 5, in which a divider for diverting stalks to the respective picker units is positioned forwardly of the front rolling support.

10. A device as set forth in claim 5, in which an elevator is mounted on the rear of the tractor and means are provided for conveying corn from the picker units to said elevator.

11. A corn harvesting machine comprising a tractor, rear wheels on said tractor adapted to run on the outside of adjacent rows of corn, a front rolling support for said tractor, said tractor having a narrow longitudinally and centrally extending body portion, and picking means mounted at one side of the tractor intermediate the rear wheels and the front rolling support for gathering corn from the row at that side of the tractor.

12. A device as set forth in claim 11, in which the front rolling support is adapted to run between the adjacent rows.

13. A corn harvesting machine comprising the combination of a tractor having a transversely extended rear axle structure supported on wheels adapted to run on the outside of adjacent rows of corn, a narrow body extending forwardly from the center of the axle structure, a front rolling support on the body adapted to run between the adjacent rows, a laterally extending support on the body in advance of the rear wheels, a picking unit pivotally mounted at one side of the tractor on said support, said unit being operable to pick corn from one of the adjacent rows at its side of the tractor, and gathering means carried by the picking unit, said means being positioned with the ground engaging ends substantially in transverse alignment with the front rolling support.

14. A device as set forth in claim 13, in which an elevator is mounted at the rear of the tractor and means are provided for conveying corn from the picker unit to said elevator.

BERT R. BENJAMIN.